US008068459B2

(12) United States Patent
Kravtsov et al.

(10) Patent No.: US 8,068,459 B2
(45) Date of Patent: Nov. 29, 2011

(54) ADAPTIVE FREQUENCY REUSE METHOD OF RADIO RESOURCES MANAGEMENT AND ALLOCATION

(75) Inventors: Vladimir Kravtsov, Jerusalem (IL); Yuval Lomnitz, Petach-Tikva (IL); Clark Chen, Beijing (CN); Shilpa Talwar, Santa Clara, CA (US); Nageen Himayat, Fremont, CA (US); Li Li, Wuhan (CN); Hua Yang, Shanghai (CN); Homgmei Sun, Beijing (CN)

(73) Assignee: Intel Corporation, Santa Clara, CA (US)

( * ) Notice: Subject to any disclaimer, the term of this patent is extended or adjusted under 35 U.S.C. 154(b) by 323 days.

(21) Appl. No.: 12/415,957

(22) Filed: Mar. 31, 2009

(65) Prior Publication Data

US 2010/0246538 A1 Sep. 30, 2010

(51) Int. Cl.
*H04L 5/22* (2006.01)
*H04J 3/00* (2006.01)
*H04W 72/00* (2009.01)

(52) U.S. Cl. ..... 370/329; 370/330; 370/336; 455/452.2; 455/451; 455/450

(58) Field of Classification Search .......... 370/336–337, 370/329–331, 319–326, 314, 343–345; 455/450, 455/464, 446, 447, 453

See application file for complete search history.

(56) References Cited

U.S. PATENT DOCUMENTS

| | | | |
|---|---|---|---|
| 2009/0040978 A1* | 2/2009 | Kim et al. | 370/329 |
| 2009/0209276 A1* | 8/2009 | Wu et al. | 455/501 |
| 2010/0061469 A1* | 3/2010 | Tao et al. | 375/260 |
| 2010/0105406 A1* | 4/2010 | Luo et al. | 455/452.2 |
| 2010/0110996 A1* | 5/2010 | Tao et al. | 370/329 |
| 2010/0260137 A1* | 10/2010 | Vrzic et al. | 370/330 |

* cited by examiner

*Primary Examiner* — Kent Chang
*Assistant Examiner* — Keith Fang
(74) *Attorney, Agent, or Firm* — Carrie A. Boone, P.C.

(57) ABSTRACT

A method for managing and allocating radio resources (RRMA method) of multiple radio resource types to subscriber stations is disclosed. The RRMA method includes bandwidth partitioning, into parts comprising "slots" with a given reuse pattern, a selection rule, to select a "cell, reuse pattern" pair serving each user, and an allocation rule, for distributing to each user an appropriate number of bandwidth slots from the selected "cell, reuse pattern" pair. After an adaptation period, the method reaches a desired fairness, while simultaneously reaching a maximal mean throughput, possible under this fairness. For big networks, the method provides basically decentralized radio resource management. The RRMA method is useful to cellular networks having a single set of orthogonal sub-channels (frequency/time slots) being reused by all network cells, such as time division multiple access (TDMA), orthogonal frequency division multiple access (OFDMA), or OFDMA/TDMA cellular systems. Particularly, the method is applicable in fractional frequency reuse cellular networks.

15 Claims, 11 Drawing Sheets

ADAPTIVE FREQUENCY REUSE METHOD OF RADIO RESOURCES MANAGEMENT AND ALLOCATION

TECHNICAL FIELD

This application relates to radio resource management in a cellular network. More particularly, this application relates to resource scheduling and selection, load balancing, resource partitioning, power adjustment in a cellular network.

BACKGROUND

A cellular network consists of multiple base stations (BSs, or simply, "cells") controlled by a common radio resource management (RRM) unit. The base stations transmit signals to multiple subscriber (mobile) stations (SS, or simply, "users") over a predetermined frequency range and bandwidth. The transmission time is divided into equal frames, which may be sub-divided into shorter time intervals. Likewise, the bandwidth may be sub-divided into equal sub-channels. Taken together, this time-frequency division may be thought of as a periodic frame structure consisting of multiple slots, which occupy certain time and frequency resources. Each "BS, slot" pair may be allocated to some subscriber station, meaning that this base station will transmit a signal to this subscriber station in this slot.

In wireless communication systems, the same slot is usually reused among neighboring base stations. In downlink transmissions (from the base station to one or more subscriber stations), there may be a strong interference from one base station to subscriber stations served by its neighboring base stations (NBS).

In a given slot, the interference to subscriber stations is determined by the location of the subscriber station and by the signal power of all base stations (assumed to be constant over frames). This motivates the notion of a reuse pattern of a slot, being defined as a vector comprising the powers of all base stations (in this slot). If each base station transmits either full power or zero power, then the reuse pattern is equivalent to the set of base stations transmitting full power. The frame is separated into a few partitions, each partition including all slots with a specific reuse pattern.

Under non-fractional frequency reuse (FFR) technology, each base station transmits in a single frame partition, but leaves other partitions unused. The FFR technique is used to improve the system spectral efficiency (vs. a non-FFR system with many partitions) or cell edge coverage (vs. a non-FFR system with a single partition). Under FFR, every base station transmits in many (all) frame partitions, benefiting from the diversity of interference conditions at the users' locations.

Under non-FFR technology, the network selects for each subscriber station its serving base station (SBS). Under FFR, however, the network selects the partition of the serving slot, together with the SBS selection. In other words, the FFR network selects a "SBS, partition" pair for each subscriber station.

Typically, a non-FFR network selects the SBS with the best spectral efficiency (SE) at the location of the user. This "select the best" rule is optimal and consistent with the structure of the non-FFR network structure. That is, the rule results in a near even "load" of base stations, where "load" means the number of served users. As used herein, when a load of base stations is deemed "near even," this means that the load of each base station is equal or approximately equal to the load of any other base station.

But the "select the best" rule is not applicable in an FFR network. Indeed, following this rule, the selected SBS would always be accompanied by the partition with the highest SBS power, and relatively lower power of the neighboring base stations. So, such "BS, partition" pairs would end up being overloaded, while other "BS, partition" pairs would have no load.

To address the load balancing problem, some selection rules are proposed that force the user to select a pattern that is not the best. These prior art solutions are sub-optimal and depend on many engineered parameters, in contrary to the simple "select the best" rule.

Thus, there is a need for an optimal resources management rule to be used in a fractional frequency reuse network.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a method for managing and allocating radio resources of multiple radio resource types to subscriber stations is disclosed. A cellular network assigns initial weight values to "BS, slot" pairs (a value per "BS, partition" pair), and transmits the vector of values to all users. The slot weight informs a user that, by selecting a "lighter" "BS, slot" pair, the user will be rewarded with more slots. Each user selects a "BS, partition" pair having the biggest ratio of SE/weight, and reports its choice (together with the SE) to the network. Based on the reports from all users, the network allocates to each currently active user its selected SBS and number of slots in the selected partition. Also, based on the users' reports and activity, the network updates the weights of the pairs. Hence, a subsequent evaluation of the "BS, partition" pairs by the user may cause the subscriber station to select a different pair. Also (less frequently than the weights), the network updates the size of the frame partitions. In this manner, sub-channel allocation is optimized to be most efficient system-wide, not just for a particular subscriber station. The RRMA method is useful to cellular networks having a single set of orthogonal sub-channels (frequency/time slots) being reused by all network BSs, such as time division multiple access (TDMA), orthogonal frequency division multiple access (OFDMA), or OFDMA/TDMA cellular systems.

As will be shown in the following details, the RRMA method is an adaptive, generalized "select-the-best" methodology, and operates in both FFR and non-FFR networks. The RRMA method provides load balancing and maximizes the mean throughput, under condition of a desired fairness.

A cellular network is made up of N "cells", with each cell being occupied by a single base station and one or more subscriber (mobile) stations, also known as users. Since the base station is essentially the "brains" of the cell, the terms "cell" and "base station" are sometimes used interchangeably. The base stations transmit signals to multiple subscriber stations or users over a predetermined frequency range and bandwidth. The transmission time is divided into equal frames, which may be further sub-divided into shorter time intervals. Likewise, the frequency band may be sub-divided into equal sub-bands. Taken together, this time-frequency division may be thought of as a periodic frame structure, with the frame consisting of multiple slots, each slot occupying a certain time and frequency interval (or a dispersed sub-set of OFDM tones).

Figure 1:
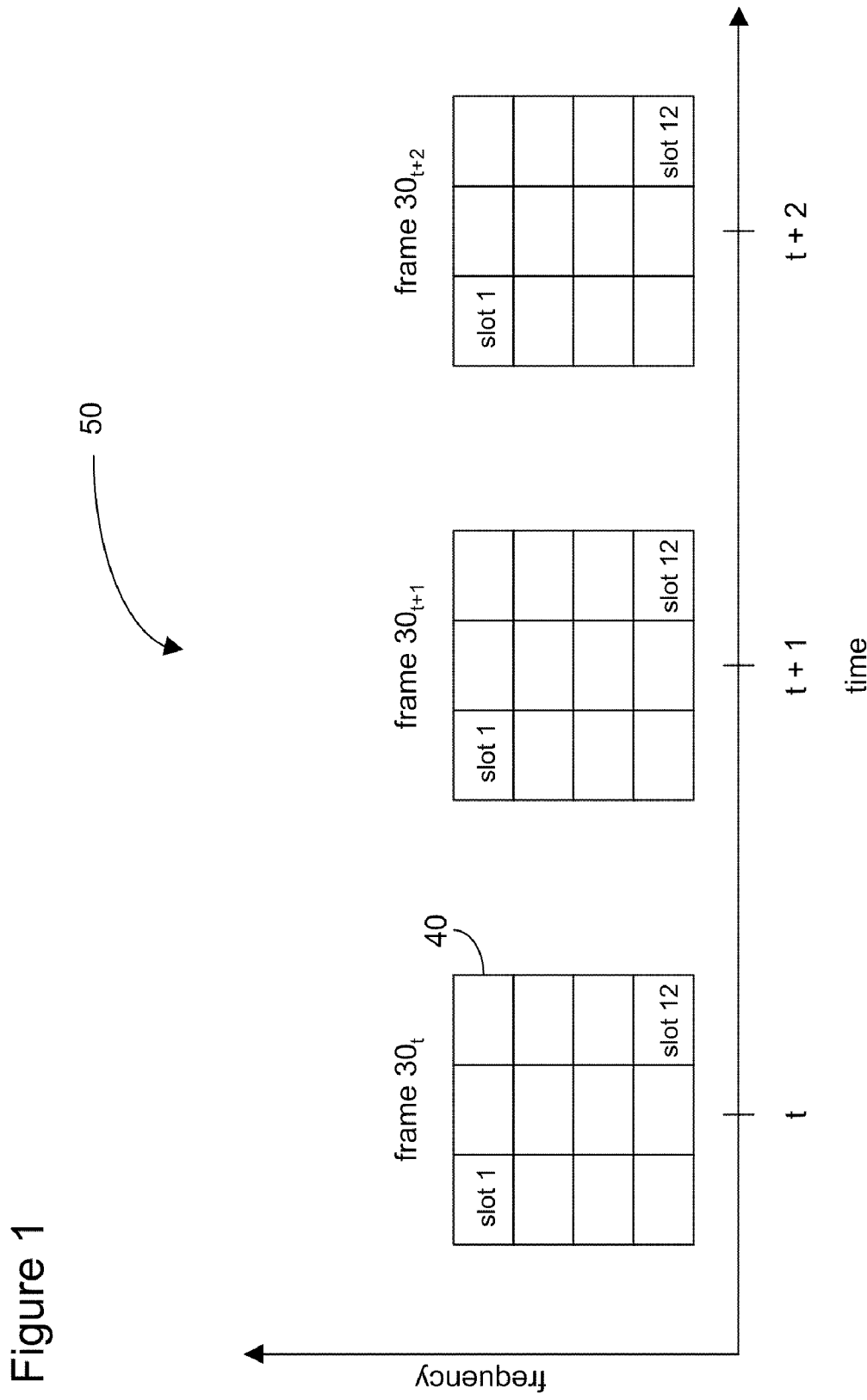
FIG. 1 is a graph depicting a frame, illustrating time-frequency division into slots, according to some embodiments.

FIG. 1 illustrates an example of this time-frequency structure, with a graph 50. In three different time periods, a single frame 30 is shown, denoted as frame $30_t$, $30_{t+1}$, and $30_{t+2}$. The frame 30 is used for transmissions between base stations and subscriber stations in the cellular network. In this example, the frame 30 includes twelve slots 40, with slot 1 and slot 12 labeled. At a first time, t, the frame $30_t$ is transmitted, with up to twelve slots being available for transmissions. At the second time period, t+1, the frame $30_{t+1}$ is again transmitted, this time with new data. At the third time period, t+2, the frame $30_{t+2}$ is transmitted, again, with completely new data. In each succeeding time period, the frame 30 is used to transmit data from any of a number of base stations to subscriber stations in the cellular network.

So, assuming a cellular network has N base stations (one base station for each cell), in each slot 40, each base station may transmit a signal to some user in the cellular network, independently from other base stations. In other words, a pair, denoted <BS, slot>, may be used for data transmission in the cellular network to a single user. Thus, such a pair is a unit of radio resource (RR) within the cellular network, and may be allocated (for transmission from within the network) to some user.

Figure 2:
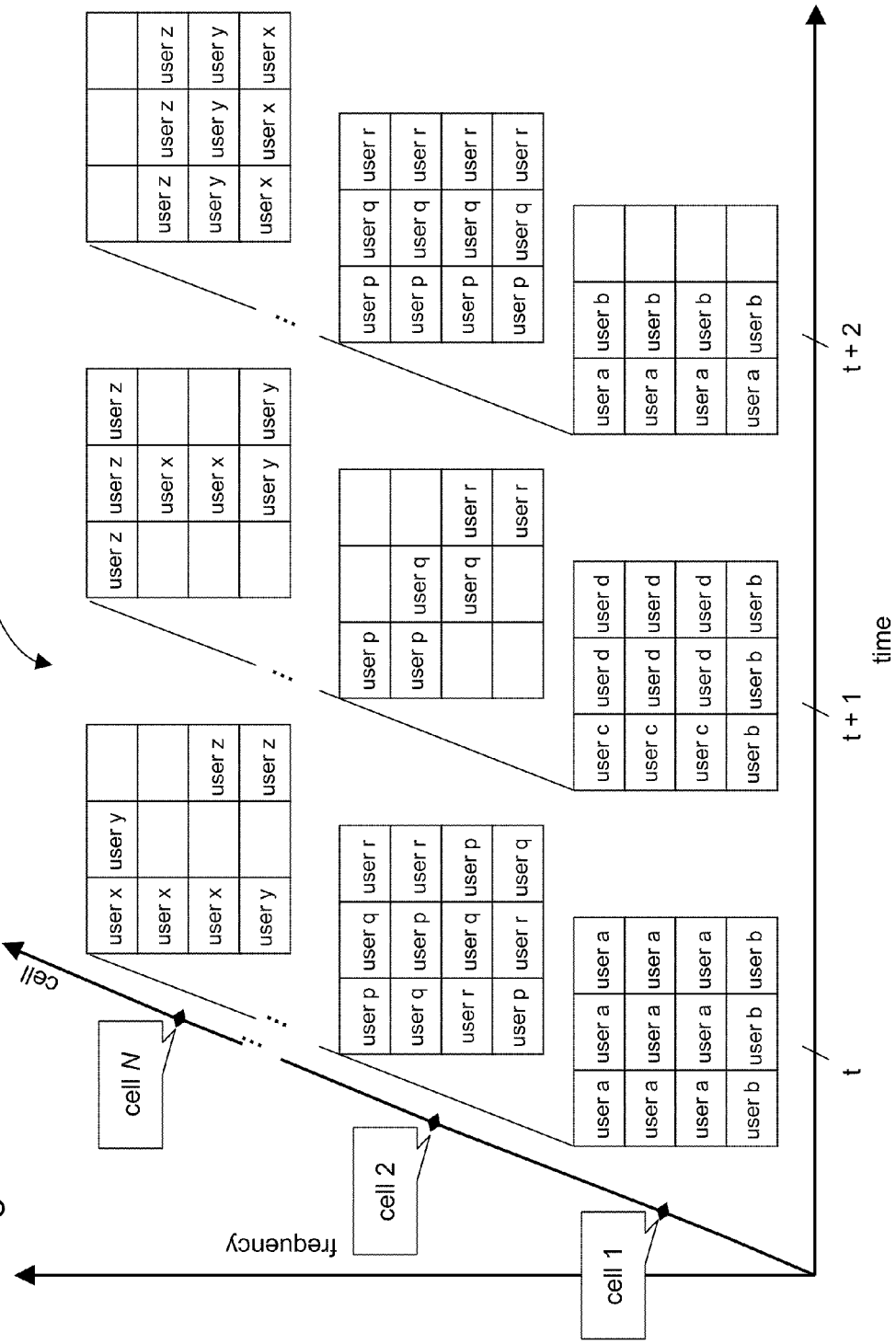
FIG. 2 is a graph of frames in a time-frequency-space division, according to some embodiments.

FIG. 2 illustrates an example of this time-frequency-space RR structure, and of RR allocation, according to some embodiments. The graph 60 is a three-dimensional graph plotting time (x axis) versus frequency (y axis) versus cell (z axis). All base stations concurrently transmit in each slot of the frame 30. In a first time period, t, BS 1 uses the twelve slots 40 of the frame 30 to transmit to users a and b, with nine slots being for user a and three slots being for user b. At the same time, t, BS 2 uses twelve slots (in the same frame 30) to transmit to users p, q, and r, with each user getting four slots. Also at the same time, t, BS N uses seven of its twelve slots (in the same frame 30) to transmit to users x, y, and z, with user x getting more slots than users y and z. In the second time period, the frame 30 may be thought of as "empty" and available for transmitting new data. In time period, t+1, BS 1 uses the frame to transmit to users b, c, and d. BS 2 uses the frame 30 to transmit to the same three users it transmitted to in time period, t, users p, q, and r, this time using half as many slots 40. BS N also transmits to the same users x, y, z that it transmitted to in the first time period, t, but uses the slots 40 in a different way. FIG. 2 also shows how BSs 1, 2, and N allocate the slots 40 to transmit to various users. For each time period, the frame 30 may be used by up to N base stations for transmission.

Focusing on a slot 40 in particular, consider a single slot 40. All base stations are said to concurrently transmit in this slot. The transmit powers may be uneven. That is, a first base station may transmit in the slot at a first power while a second base station transmits in the slot at a second power. A reuse pattern of the slot is defined herein as a vector having the transmit powers of all base stations in the slot.

Two transmissions in one slot by two different base stations tend to interfere with one another. The stronger transmissions are more robust, but tend to interfere with the weaker transmissions. Thus, the pair, <BS, reuse pattern> determines the quality of the <BS, slot> RR unit.

Figure 3:
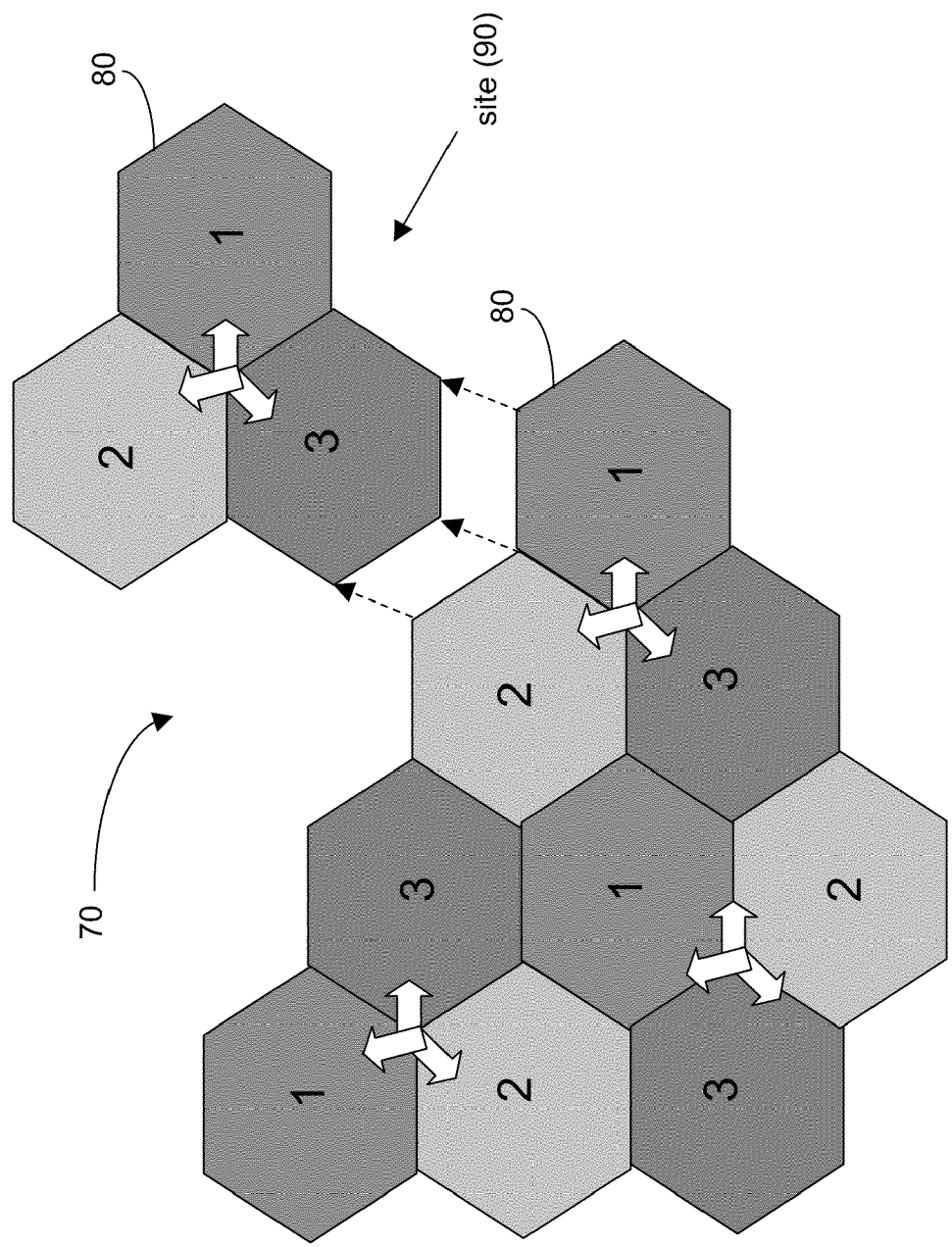
FIG. 3 illustrates is a diagram of a fractional frequency reuse network in which BSs ("sectors") are grouped into "sites", with three co-located BSs in each site, according to some embodiments.

Formally, the reuse pattern vector dimension may be as big as N. Practically, however, the reuse pattern vector will be smaller than N, as many BSs transmit with the same power. To clarify the notion, a fractional frequency reuse network 70 is depicted in FIG. 3, according to some embodiments. Each "site" 90 is made up of three co-located base stations or "sectors" 80 (denoted 1, 2, 3, and colored red, green, and blue, respectively). In FIG. 3, one site 90 is separated from the rest of the network 70 for illustration. Each sector 80 of a particular color (number) has an antenna pointing in the same direction (antenna direction is indicated by the arrows).

For the FFR network 70, in a given slot 40, each sector 80 of a given color in the site 90 transmits the same "color power". Hence, the "reuse pattern" is a three-dimensional vector, $r=(p_{red}, p_{green}, p_{blue})$. Further, each of the "color powers" may be equal either to a first power value, $p_{low}$, or to a second power value, $p_{high}$. From this, there are therefore eight possible reuse patterns possible in the FFR network 70:

$r_0=(p_{low}, p_{low}, p_{low})$
$r_1=(p_{high}, p_{low}, p_{low})$
. . .
$r_7=(p_{high}, p_{high}, p_{high})$ A network may apply, not all of the possible reuse patterns, but instead, only a few of them. For example, it does not make sense to apply vector $r_0$, because, for any user, the pattern, $r_7$, provides a better signal-to-interference-plus-noise ratio (SINR).

Figure 4:
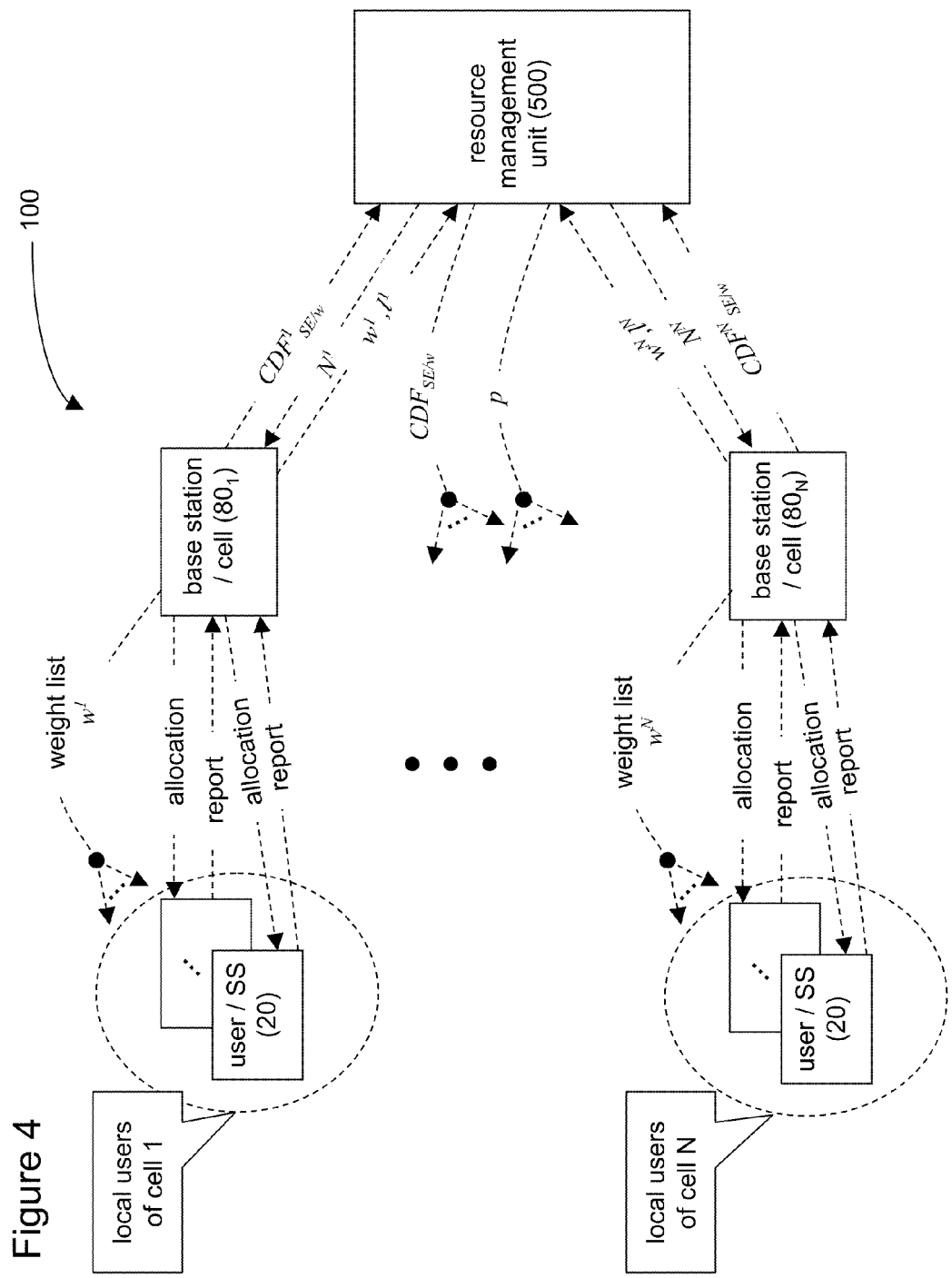
FIG. 4 is a diagram of a novel radio resource management and allocation method, according to some embodiments.

A radio resource management and allocation (RRMA) method 100 is depicted in FIG. 4, according to some embodiments. The RRMA method 100 is optimally used in a fractional frequency reuse network such as the network 70 of FIG. 3. The RRMA method 100 includes bandwidth partitioning, as well as a selection rule and an allocation rule for radio resources within the cellular network. The RRMA method 100 partitions the bandwidth into sub-channels or slots with a given reuse pattern. The selection rule selects a <BS, reuse pattern> pair serving each subscriber station (user) in the cellular network. The allocation rule distributes to each user the correct number of bandwidth slots from the selected <BS, reuse pattern> pair. After an adaptation period, the cellular network using the RRMA method 100 reaches a predetermined fairness criterion. Further, using the RRMA method 100, the cellular network reaches a maximum mean throughput under this fairness criterion, in some embodiments. The RRMA method 100 operates in both small networks and big ones, with the bigger networks essentially operating as decentralized smaller ones.

For the RRMA method 100, a radio resource management unit (RMU) 500 communicates with N base stations 80 throughout the cellular network. Each base station 80 communicates with one or more subscriber stations or users 20. The straight-line connections between RMU 500 and base station 80 or between base station 80 and user 20 are individual transmissions, whereas the curved line transmissions indicate broadcast transmissions. The illustration of FIG. 4 is referred to throughout the detailed description of the RRMA method, below. To understand the operations performed by the RRMA method 100, several terms are defined, as given in Table 1.

TABLE 1

Definitions for fairness

| term | definition |
| --- | --- |
| Th(u) | throughput of a user (averaged over many frames) |
| mTh | mean throughput - average of Th(u) over all users in network |
| rTh(u) | relative throughput of user u; rTh(u) = Th(u)/mTh |

Using these terms, the following formula is used to define fairness:

$$\text{CDF}_{rTh}(x) = F(x) \quad (1)$$

where $\text{CDF}_{rTH}$ is the histogram of rTh (with CDF being shorthand for cumulative distribution function). In other words, $\text{CDF}_{rTh}(x)$ is the fraction of users with rTh(u)<x, where x is any real number. As shown in FIG. 4, the local CDFs are sent by the base stations 80 to the RMUS, based on reports obtained from the subscriber station(s) 20. The RMU 500 periodically unites local CDFs into global one and broadcasts this updated global CDF to all base stations in the network. These operations are described in more detail, below.

In some embodiments, the RRMA method 100 divides the bandwidth used for transmission into equal periodic frames, which are then further sub-divided into equal sub-channels or slots. FIGS. 1 and 2 show a frame 30 divided into twelve equal slots 40. Each slot 40 has a characteristic of "reuse pattern" that determines the quality of transmissions using that slot. A single unit of network radio resource (RR) is denoted by the pair, <BS, slot>. All such pairs form the total radio resources of the cellular network, "total network RR". The pair, <BS, reuse pattern>, is known as a radio resource type (RRT).

Table 2 includes terms used in describing the FFR network, according to some embodiments.

TABLE 2

Terms used in the FFR network description

| term | definition |
| --- | --- |
| N | number of BSs in the cellular network |
| S | number of slots in the frame, or frame size |
| N · S | number of RR units in "total network RR" |
| r | reuse pattern |
| $p_r$ | number of slots with reuse pattern r in frame |
| $p = (p_r)$ | frame partitioning vector |
| T("Tau") | the set of all RRTs ("BS, reuse pattern" pairs) in the network |
| τ | a single RRT ("BS, reuse pattern" pair) in T |
| p(τ) | number of RR units with RRT τ<br>by definition, τ = "BS c, reuse pattern r" ⇒ p(τ) = $p_r$ |
| cell(τ) | BS component of RRT τ<br>by definition, τ = "BS c, reuse pattern r" ⇒ cell(τ) = c |

Table 3 includes terms used in the selection rule of the RRMA method 100, according to some embodiments.

TABLE 3

Terms used in the selection rule

| term | definition |
| --- | --- |
| $w_τ$ | unit weight of RRT τ |
| $w = (w_τ)$ | RRT unit weight list, τ ∈ T |

The RRT unit weight list is a vector, $w=(w_τ)$, τ∈T, where an entry, $w_τ$, denotes the "unit weight" of specific RRT τ. The "weight" of any RR set is defined as the sum of "weights" of RR units forming the set.

In some embodiments, the cellular network transmits and each user u receives the current RRT weight list, w. In FIG. 4, the weight list, w, is broadcast by each base station 80 to its users 20. In the RRMA method 100, each user estimates the following values, as shown in Table 4. Note: the ergodic (that is, averaged over time) spectral efficiency (SE) of the RR unit is determined by its RRT and by the location of the user; hence, for a given user, all RR units with the same RRT have the same (ergodic) SE.

TABLE 4

Values measured by user u

| term | definition |
| --- | --- |
| SE (τ,u) | SE of (any) RR unit with RRT τ, for all RRTs |
| w-best RRT | $θ_w(u) = \text{argmax} [SE (τ,u)/w_τ]$ |
| SE of w-best RRT | $SE_w(u) = SE (θ_w(u), u)$ |

Each user periodically reports the values $θ_w(u)$ and $SE_w(u)$ to its SBS (in some embodiments, user reports $SE_w(u)$ of the preferred resource units and corresponding sub-channel indexes, or CINR or other information determining SE, instead of SE). FIG. 4 shows each user reporting these estimates to its serving base station, in a cellular network comprising N base stations, $BS_c$, c=1, . . . , N.

FIGS. 7-11 are flow diagrams showing the operations of FIG. 4 in greater detail. FIG. 4 shows transmissions of measurement and control information throughout the network, but does not specify times/triggers for the transmissions. FIGS. 7-11 specify these times/triggers, and show SS/BS/RMU states, transitions between the states, and transmissions of the information. In FIGS. 4 and 7-11, shapes with solid contours denote SS/BS/RMU states, and solid lines denote the state transitions. Shapes with dashed contours denote SS/BS/RMU memories, and dashed lines denote data flows.

Figure 7:
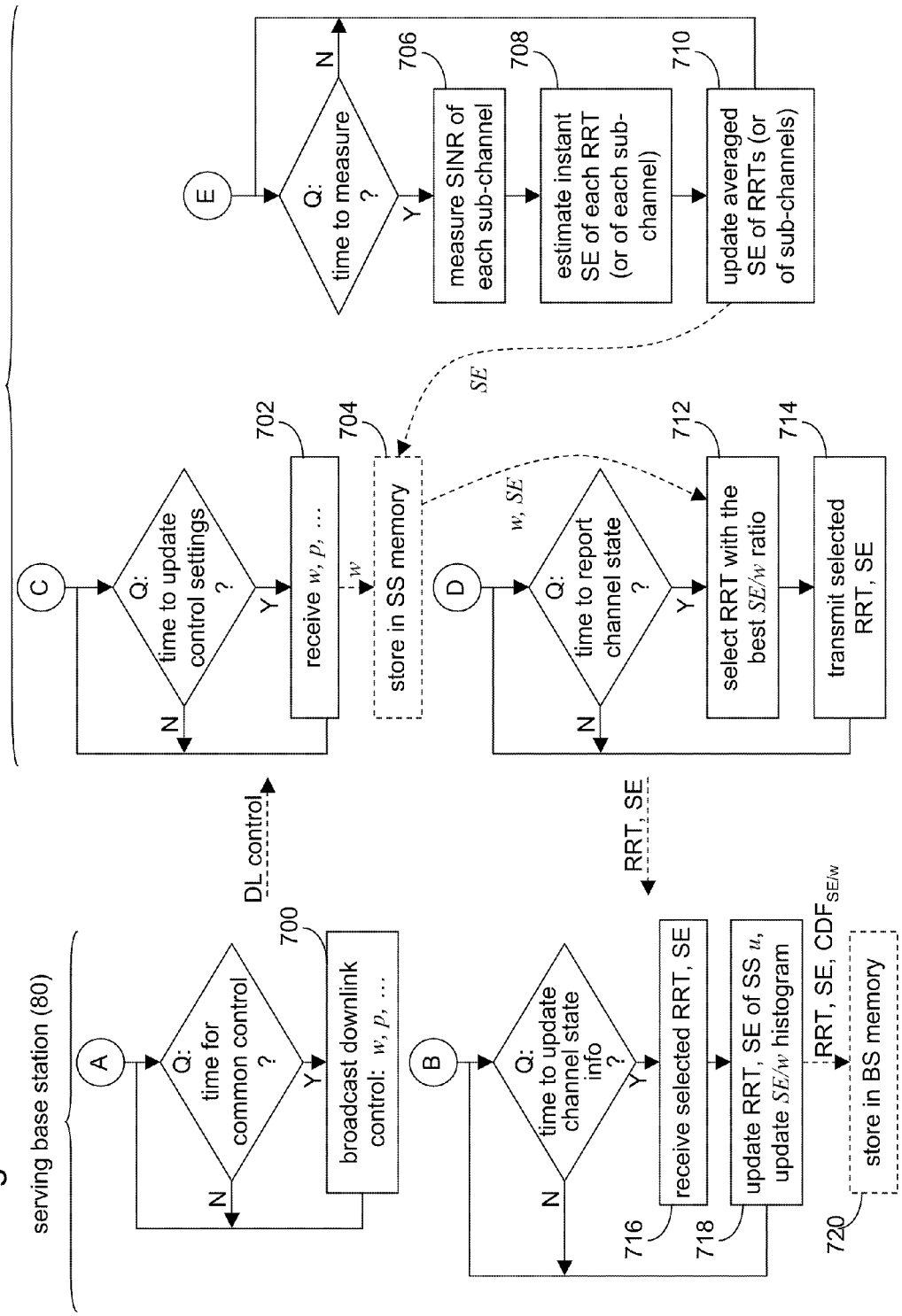
FIG. 7 is a series of flow diagrams showing cycles of w-broadcast, SINR measurement, and RRT/SE reporting, as performed by the radio resource allocation method of FIG. 4, according to some embodiments.
Figure 8:
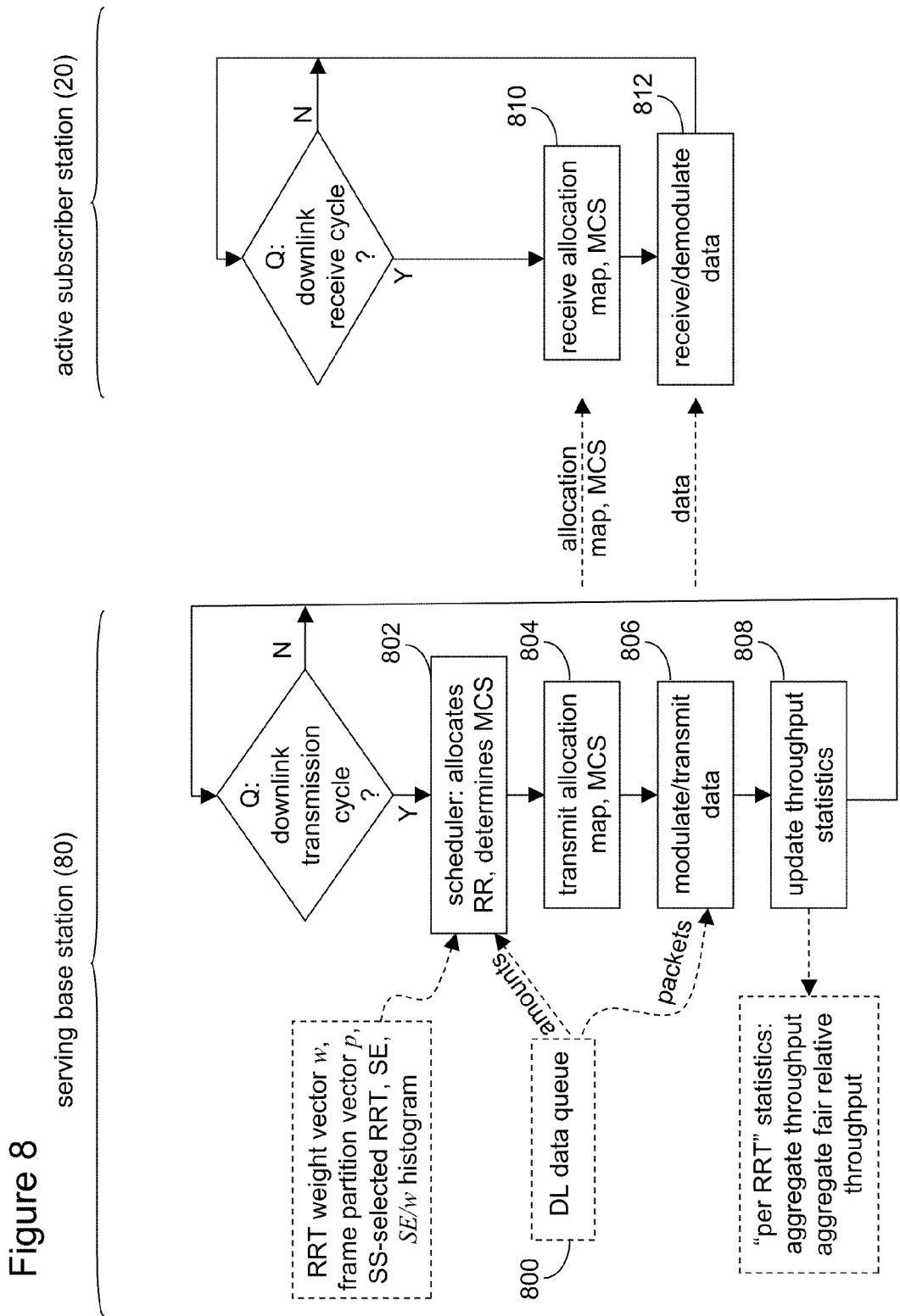
FIG. 8 is two flow diagrams showing cycles of radio resource allocation and data transmission of the radio resource allocation method of FIG. 4, according to some embodiments.
Figure 9:
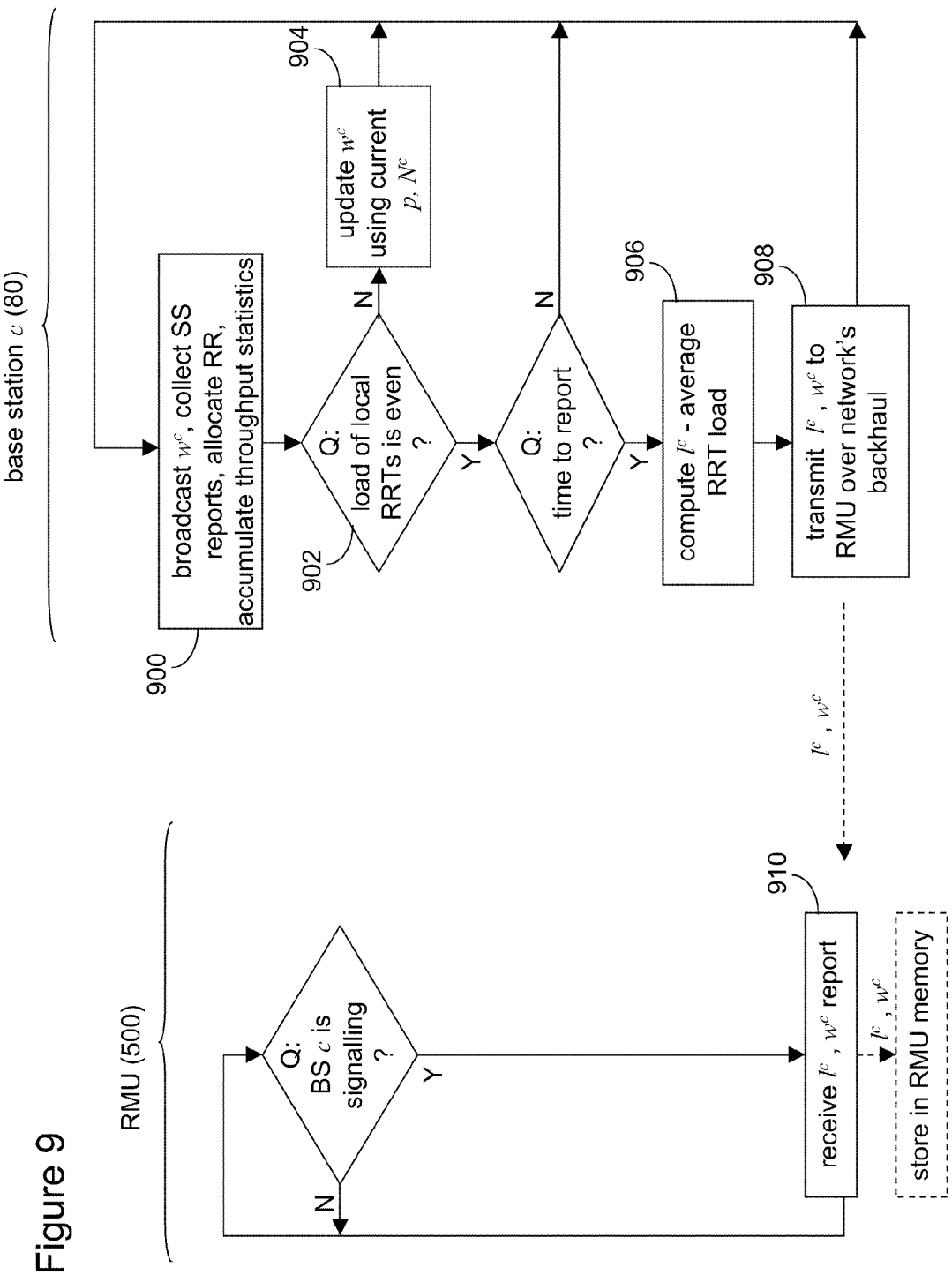
FIG. 9 is two flow diagrams showing cycles of $w^c$-update and the collection of base station reports in a big network, as performed by the radio resource allocation method of FIG. 4, according to some embodiments.
Figure 10:
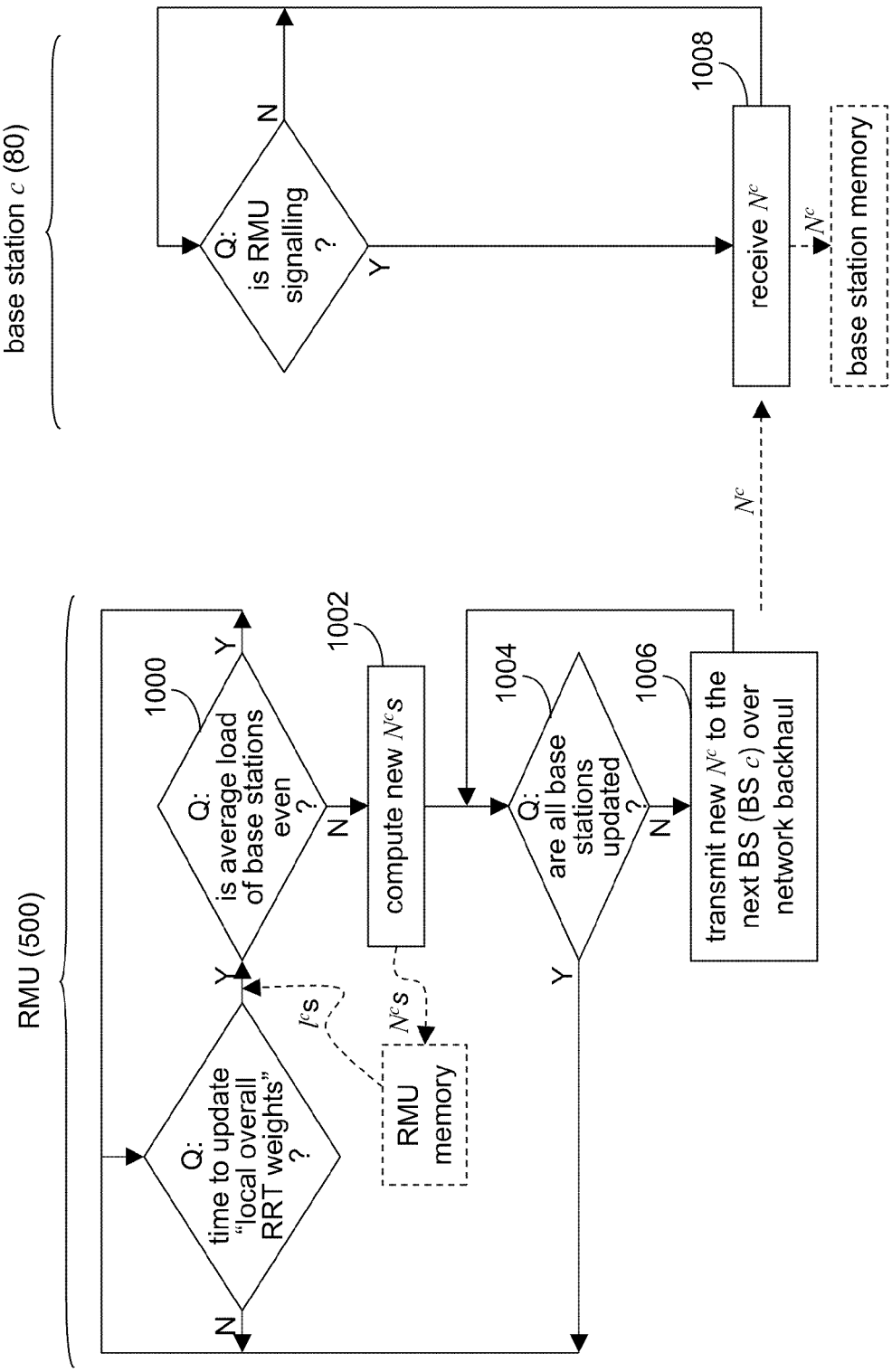
FIG. 10 is two flow diagrams depicting updates of the overall weight of the base station local RRTs, as performed by the radio resource allocation method of FIG. 4, according to some embodiments.
Figure 11:
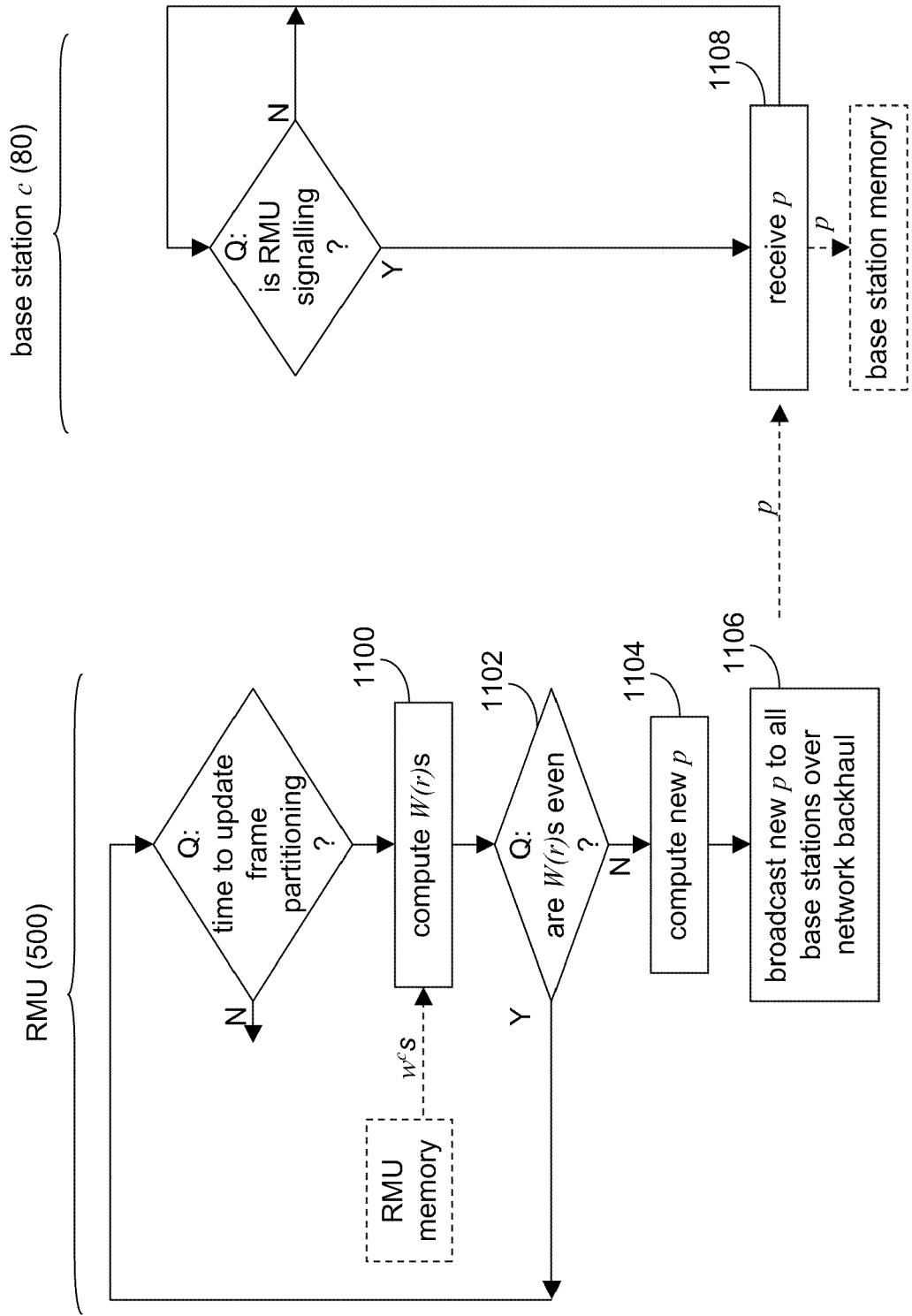
FIG. 11 is two flow diagrams depicting operations between the resource management unit and a base station in updating the frame partitioning vector, as performed by the radio resource allocation method of FIG. 4, according to some embodiments.

FIGS. 7 and 8 depict the operations of FIG. 4 between each base station and the subscribers served by the base station. FIGS. 9-11 depict the operations between the RMU and the base stations.

FIG. 7 features a series of flow diagrams showing operations performed by the RRMA method 100, according to some embodiments. The operations of FIG. 7 take place between a serving base station 80 and subscriber station u 20. Several of these operations are periodic. Thus, the flow diagrams are labeled, with flow diagrams A and B being performed by the serving base station 80 and flow diagrams C, D, and E being performed by the subscriber station u. FIG. 7 shows that several control parameters are broadcast by the serving base station 80 to the subscriber station 20. The SE and RRT are subsequently transmitted by the subscriber station 20 back to the serving base station 80.

As it is done usually, the serving base station 80 periodically broadcasts the current downlink settings. But, with the RRMA method 100, as shown in flow diagram A, the base station 80 broadcasts the RRT weight list w and the frame partitioning vector, p (block 700), in addition to usually transmitted control parameters. (Where the network is a small network, the weight list, w, is a full weight list, but when the network is a big network, the weight list, $w^c$, is the local weight list of base station c, as defined in Table 8, below.) Moving to the flow diagram C, during the transmission, a fraction of subscribers stations 20 receive the current downlink settings (block 702) and stores them in subscriber station memory (block 704), to be used later. Thus, each subscriber station 20 is tracking the current weight list vector, w, as well as other control variables that have been broadcast by the serving base station.

Continuing with the flow diagram E, the subscriber station 20 periodically measures the "instant" SINR of every subchannel (block 706), that is, the SINR at that instant in time. Further, the subscriber station 20 computes the "instant" average spectral efficiency of each RRT (block 708) and updates the time-averaged spectral efficiency of each frame partition (block 710). In networks utilizing a well-known "opportunistic scheduler" method, the subscriber station 20 updates the spectral efficiency of individual sub-channels as well (block 710).

Moving to flow diagram D, under the selection rule, the subscriber station 20 also periodically computes the ratios of the RRT's spectral efficiency to its weight (or sub-channel's SE to the RRT weight, if an "opportunistic scheduler" is used), and selects the RRT (or sub-channel) with the highest ratio (block 712). Then, the subscriber station 20 reports its choice according to the selection rule to the base station (block 714). The measurement and report is done as described above. Moving to flow diagram B, the base station 80 receives the report from the subscriber station 20 (block 716), stores the newly selected RRT and SE, and updates the histogram of SE/w ratio (block 718), known as the "normalized spectral efficiency," and stores the received information in a base station memory (block 720).

TABLE 5a

Terms used in allocation rule (beginning)

| term | Definition |
| --- | --- |
| w-efficiency: SE/w(u) | $SE/w(u) = SE_w(u)/w_\tau$, where $\tau = \theta_w(u)$ = w-best RRT of the user |
| $CDF^k_{SE/w}$ | "local" histogram of SE/w(u) over all users being served by $BS_k$, |

TABLE 5a-continued

Terms used in allocation rule (beginning)

| term | Definition |
| --- | --- |
| $CDF_{SE/w}$ | "global" histogram of SE/w(u) over all users in the network |
| active user | such a user that the network currently has data to transmit to |

According to the users' reports, each base station, $BS_k$, stores/updates the w-best RRT and its SE of the users it serves.

During each data transmission cycle, base station k, $BS_k$, allocates to each active user a number of slots with its best RRT. The allocated numbers depend on the size of the frame partitions, on the number of active users, on their w-efficiencies, and on the global histogram $CDF_{SE/w}$, which is described in more detail below.

The histogram $CDF_{SE/w}$ isn't pre-known, but the network "learns" it as follows: getting the users' reports, each $BS_k$ computes/updates $CDF^k_{SE/w}$, the histogram of SE/w(u) over all users it is serving. Periodically, the radio resources management unit (RMU) 500 collects all local histograms, computes from them the global histogram, $CDF_{SE/w}$, and broadcasts the computed $CDF_{SE/w}$ back to all the base stations.

Radio Resource Management in a Centralized Network

The RRMA method 100 performs radio resource management in a centralized network, which may be a "small" network. For a centralized network, the RMU 500 may be thought of as part of the base station 80, or a part of the network site 90 (FIG. 3). Operations of the radio resources management unit 500 are depicted in the flow diagram of FIG. 5, according to some embodiments. Refer also to FIG. 4 for a depiction of the process flows. The flow diagram has several loops, indicating that operations are performed periodically.

Periodically, the base stations 80 collect reports from users 20 (block 202), the cellular network generates the histogram, $CDF_{SE/w}$ (block 204), such that the histogram is permanently updated. The histogram, along with the partitioning vector, p, the weight list, w, and the fairness function, F, are used to then allocate radio resources to the users (block 206). In some embodiments, one allocation period contains a single frame. In other embodiments, one allocation period contains multiple frames.

Allocating radio resources, the network accumulates two statistical values per RRT: "aggregate throughput" and "aggregate fair relative throughput" (block 208), the ratio of which defines an "RRT load". Aggregate throughput and aggregate fair relative throughput are described in more detail below in Table 6a; RRT load is described below in Table 6b, and then discussed. If the statistics have not sufficiently accumulated (block 210), the above process is repeated. Once the statistics are deemed ready (block 210), the RRT load is computed (block 212). If the load of RRTs is not even (block 214), the cellular network updates the weight list, w (block 216), and control returns immediately to the beginning of the w-update cycle, which is repeated. Otherwise the old vector w is preserved, and the average partition weights are computed (block 218).

If, after computing the average partitions weights, they are even, that is, equal one to another (block 220), the cellular network preserves the partitioning vector, p (block 222), and control returns immediately to the beginning of the p-update cycle. If the average partition weights are not even, then the network updates p, the algorithm starts back at the beginning and repeats.

Figure 5:
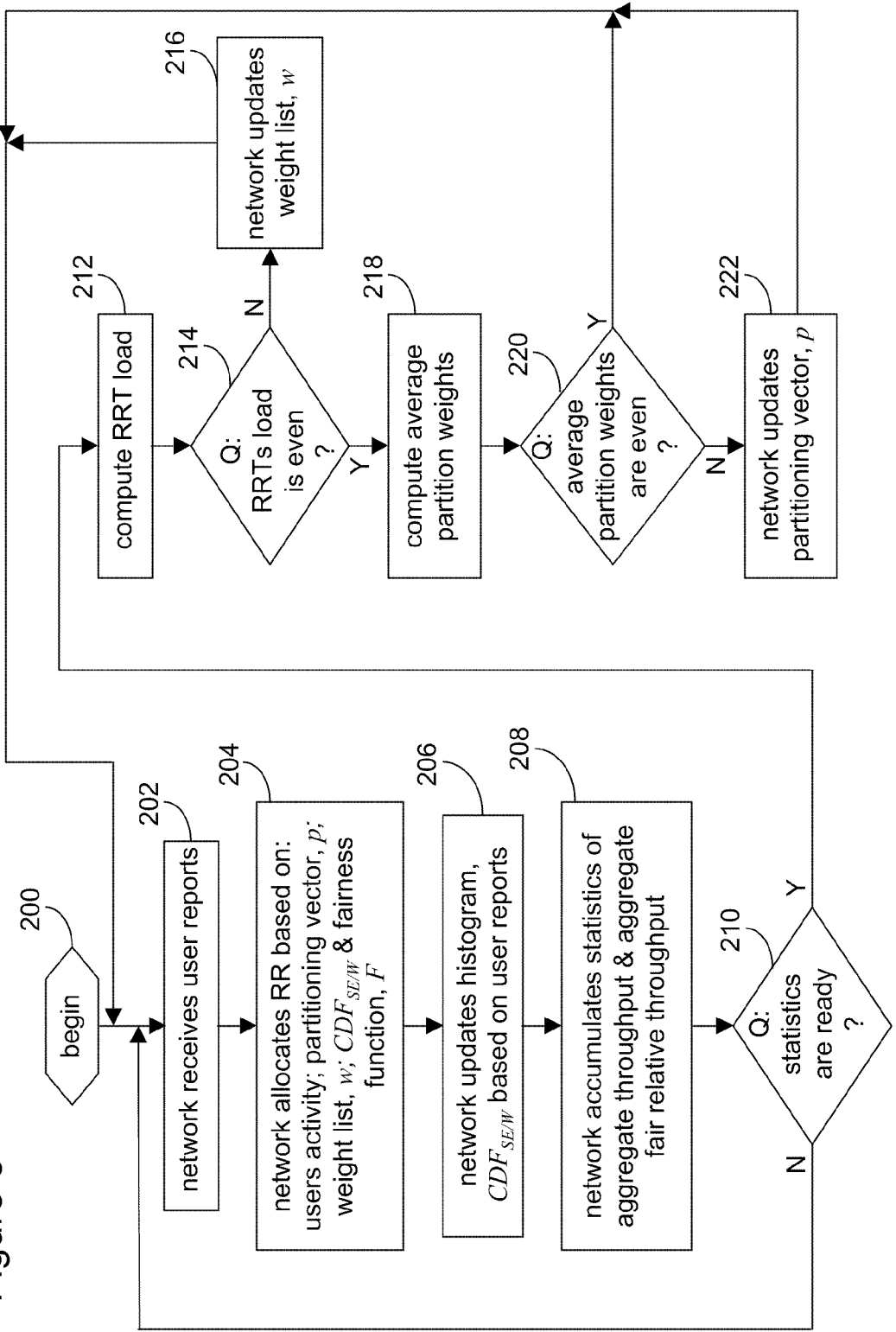
FIG. 5 is a flow diagram showing operations of the radio resource allocation method of FIG. 4, according to some embodiments.

As illustrated in FIG. 5, during a single allocation cycle, the cellular network collects the reports of the users (block 202). Based upon these reports, the cellular network computes/updates the histogram, $CDF_{SE/w}$ (block 204).

In some embodiments, the cellular network allocates a radio resource to each active (in this cycle) user, in such a way that the user u gets the radio resource with its "w-best" radio resource type, $\theta_w(u)$ (Table 4). Thus, the allocated "BS, partition" pair is determined by $\theta_w(u)$ selection, but the number of allocated slots is computed by the network, as described below.

TABLE 5b

Terms used in the allocation rule (continued)

| term | Definition |
| --- | --- |
| a(u) | number of allocated RR units ("allocation size") |
| iTh(u) | throughput to the user in current allocation cycle, also known as instant throughput; by definition, iTh(u) = a(u) · $SE_w$(u) |
| fair relative throughput fTh(u) | defined by the computation below; intuitively: relative throughput which a user with this w-efficiency should get |
| L(τ) | proportionality constant between iTh(u) and fTh(u), in a set of all users selecting RRTτ |

Figure 6:
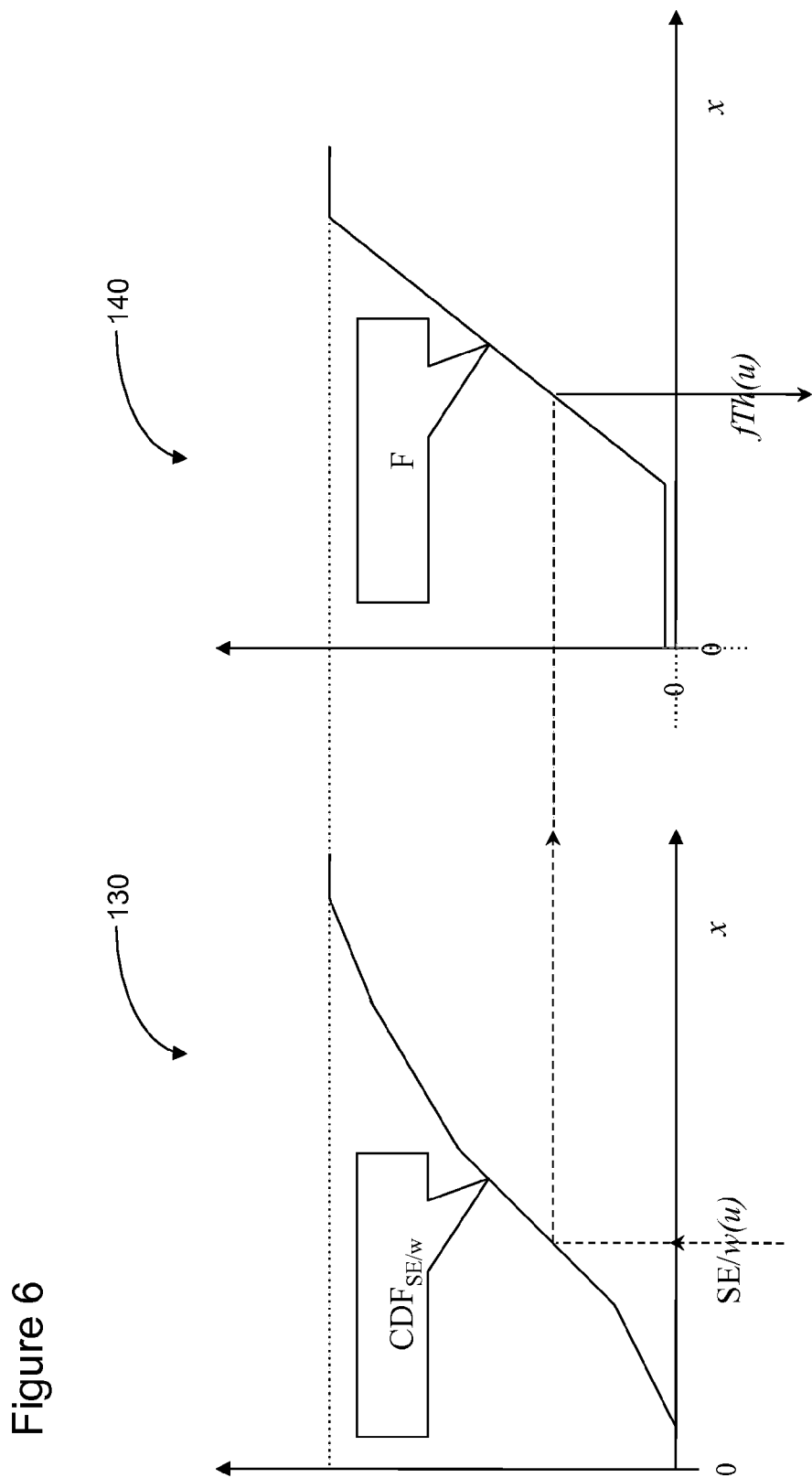
FIG. 6 is a graph showing the relationships between several variables used by the radio resource management and allocation method of FIG. 4, according to some embodiments.

In order to compute a(u), the network first assigns to users their "fair relative throughputs". The computation of fTh(u) from SE/w(u), $CDF_{SE/w}$, and F is illustrated in FIG. 6, according to some embodiments. A first graph 130 shows the cumulative distribution function curve, $CDF_{SE/w}$, while the second graph 140 shows the fairness function, F. As one can see, the following equation applies:

$$fTh(u) = F^{-1}(CDF_{SE/w}(SE/w(u))) \quad (2)$$

The number of allocated slots, a(u), is computed from the following:
  inside the set of all active users with the last selected RRT equal to τ, iTh(u) ∝ fTh(u)
  that is, $\theta_w(u) = \tau \Rightarrow a(u) \cdot SE_w(u) = fTh(u)/L(\tau)$, where L(τ) is the proportionality constant for RRTτ
  the sum of all a(u)s, with RRT=τ is equal to p(τ)

During each allocation cycle, the network provides some throughput statistics for the next update of the RRT unit weight list w (Table 3). Namely, in some embodiments, for each radio resource type, the cellular network accumulates the following variables, as indicated in Table 7.

TABLE 6a

Provisioned throughput statistics, to update weight list

| term | Definition |
| --- | --- |
| aggregate throughput Th(τ) | sum of all iTh(u)s with selected RRT = τ, averaged over all allocation cycles in the current w-update cycle |
| aggregate fair-relative throughput fTh(τ) | sum of all fTh(u)s with selected RRT = τ, averaged over all allocation cycles in the current w-update cycle |

To compute a(u) for some user u, or to compute fTh(τ) and Th(τ) for some RRT τ, the histogram $CDF_{SE/w}$ of SE/w over all users is needed. Hence, in some embodiments, all users' reports are collected together and processed in a centralized way. This can be done in a small network, but in a big one this may be impractical. Also, in a big network, it is impractical to inform a user about all RRT weights.

FIG. 8 features two flow diagrams, one for a serving base station 80 and the other for an active subscriber station 20, showing the cycle of radio resource allocation and data transmission by the RRMA method 100, according to some embodiments.

Periodically, the serving base station 80 checks the state of the downlink data streams in the downlink queue (block 800) and allocates one or more radio resources to the active data streams (block 802). To allocate the radio resources, the base station 80 is using the current frame partition, p, selections of radio resource types, and the spectral efficiency of the active subscriber stations 20 that are stored in the base station memory. The radio resource allocation is achieved as described above.

The base station 80 then transmits an "allocation map" (block 802), modulates the data of all the currently active users with their determined modulation coding schemes (MCSs), and transmits them using the allocated radio resources (block 804), as also illustrated in FIG. 4. At the same time, each active subscriber station 20 receives the allocation map containing its radio resource allocation and MCS (block 810), then receives/demodulates its data (block 812). Finally, the base station 80 updates the throughput statistics (block 808), as described in FIG. 5.

During the w-update cycle, the cellular network accumulates "aggregate throughputs" Th(τ) and "aggregate fair-relative throughputs" fTh(τ). At the end of the cycle, Th(τ) and fTh(τ) are ready.

Next, the network computes the final throughput statistics, as shown in Table 6b, according to some embodiments.

TABLE 6b

Throughput statistics used to update weight list

| term | Definition |
| --- | --- |
| load factor of RRT τ l(τ) | fTh(τ)/Th(τ) (see Table 6a) |
| $l_{mean}$ | mean value of l(τ), over all RRTs |

Then, the network updates w. In some embodiments, there are different ways to update w, but the following conditions should be held:
  $l(\tau) < l_{mean} \Rightarrow w_\tau$ is decreasing;
  $l(\tau) > l_{mean} \Rightarrow w_\tau$ is increasing;
  The new "weight" of the total network radio resource is equal to N·S (as well as the old "total weight").

In Table 6b, the load factor of RRT τ is another way of saying the overall fair relative throughput assigned to users selected RRT τ divided by the overall actual throughput directed to these users. Consider a non-FFR network, with each base station transmitting in a single partition. In this prior art network, the load factor of a base station would be equal to the number of users served by this base station. Fair relative throughput to a single user depends on its SINR, but does not depend on the number of co-served users (by the user's serving base station). Assume that, for all base stations, the spectral efficiency histogram of the users served by the serving base station are the same. (In FFR networks, the spectral efficiency histograms of RRTs are different.) Then, the sum of fair throughputs to all users served by that base station is proportional to the number of served users. But, the sum of the throughputs to all users served by the SBS is equal to the cell capacity, the number of users does not matter. Thus, the aggregate fair throughput of the base station divided by the aggregate throughput of BS μ number of served users.

Hence, in a non-FFR network, the load factor is equal to that of the prior art, up to the proportionality constant. In the FFR network, to balance "prior art loading factors" is not good, as RRTs have different spectral efficiency and should thus not have an equal number of served users. But, to balance the load factors is desirable, in some embodiments, as it enables the network to reach its maximum capacity under a given fairness criterion.

In some embodiments, one motivation for the w-update rule above is that the network tries the load factors of all RRTs to be even. When the evenness is obtained, the throughput of each user, Th(u), is proportional to its "fair-relative-throughput", fTh(u). This implies that:

$CDF_{rTh}(x) = F(x)$ mTh is maximum possible under the current partitioning vector, p The implication is proven analytically (the proof is omitted here).

Inside a single p-update cycle, p is constant, but, by varying RRT weights w, the network tries to make the load factors l(τ) even. At the end of the cycle, the evenness is reached. Then, the network computes the following, as given in Table 7.

TABLE 7

Terms used in p-update rule

| Term | Definition |
| --- | --- |
| average pattern weight W(r) | mean of the weights $w_{cell\ c,\ reuse\ pattern\ r}$ over all BSs c |
| $W_{mean}$ | the mean value of all W(r)s, over patterns |

Further, the network updates p so, that:

$W(r) < W_{mean} \Rightarrow p_r$ is decreasing $W(r) > W_{mean} \Rightarrow p_r$ is increasing The sum of all $p_r$ figures is equal to S.

In some embodiments, one motivation for the above p-update rule is that the network tries to make the average RR unit weights, W(r)s, even. When the evenness is obtained, the pair <w, p> is said to be in a steady state. In this state:

$CDF_{rTh}(x) = F(x)$ mTh is maximum possible

This is proven analytically (the proof is omitted here). Also, it is proven that the steady state is reachable.

Radio Resource Management in a Decentralized Network

The following discussion is for RR management in a decentralized, "big", or "global" cellular network. As explained above, for a small network, during every allocation cycle, the network collects all reports of all users and processes them in a centralized manner. Once every few allocation cycles, the total RRT weight list is transmitted to each user in the small network. Once a network has reached a certain size, and is thus deemed "big", such a protocol is impractical.

Thus, in some embodiments, the RRMA method 100 addresses the decentralized network in a different manner than is described above for smaller, more manageable networks. The RRMA method 100 divides the global network into small, "local" sub-networks. Each of the local networks contains either a single BS or a group of close, adjacent BSs. For notation simplicity and without loss of generality, the RRMA method 100 assumes that each local sub-network contains a single BS, so it may be identified with this BS.

The RRMA method 100 uses more notation, as indicated in Table 8.

TABLE 8

Terms used in RR management of a big network

| term | Definition |
| --- | --- |
| $T^c$ | "local" RRTs of BS c = all RRTs τ ∈ T, such that cell(τ) = c |
| $w^c$ | "local" weight list of BS c = sub-vector of weight list w = ($w_τ$), containing entries $w_τ$ with τ ∈ $T^c$ |
| $CDF^c_{SE/w}$ | "local" SE/w(u) histogram = histogram of SE/w(u) over "local users" (those with $θ_w(u) ∈ T^c$) |
| $N^c$ | "BS weight", mean weight of BS local RR unit (over all local RR units) |
| $N^c \cdot S$ | assigned "local RR weight" = weight of all "local" RR units (those with RRT(α) ∈ $T^c$). |
| $l^c$ | "BS load factor" = mean of load factors l(τ) over local RRTs τ |
| $l^c_{mean}$ | mean of $l^c$ over all BSs |

Table 8 introduces "BS weight", $N^c$, which is the ratio of the "overall BS local resource weight" to the size of frame S. The sum of $N^c$s must be equal to N, the number of cells (base stations) in the network. A centralized network updates the total weight list, keeping the total weight (of all network radio resources) equal to S×N. Thus, in a centralized network, $N^c$ is not needed. In a big network, however, each BS updates its local weight list, keeping the total weight (of its local radio resources) equal to S×$N^c$.

In an allocation cycle, each BS operates like a separate small network. However, each BS also has the following features:

BS c transmits and its "local users" receive the BS's weight list, $w^c$, (optionally, the local users receive the weight lists of neighboring BSs, but not the global weight list, w)

BS c collects reports of its local users; on the basis of these reports, BS c computes/updates the local histogram, $CDF^c_{SE/w}$ computation of fTh(u) is based on the "global" histogram, $CDF_{SE/w}$, provided to the BS by the (big) network the total weight of the local RR must be equal to $N^c \cdot S$, where the BS-weight, $N^c$, is provided by the (big) network on the basis of the local Th(τ) and fTh(τ), BS c computes $l^c$ = mean of fTh(τ)/Th(τ) over local RRTs;

In a w-update cycle, each BS operates like a separate small network, but the big network operates as follows:

during the w-update cycle, each BS c accumulates the BS load factor, $l^c$, and the local histogram, $CDF^c_{SE/w}$; at the end of the cycle, $l^c$ and $CDF^c_{SE/w}$ are ready then a central resource management unit (RMU) of the big network collects local histograms, $CDF^c_{SE/w}$ from all BSs on the basis of this collection, the big network computes the global histogram, $CDF_{SE/w}$ (the histogram over all network users) and transmits $CDF_{SE/w}$ back to the BSs FIG. 9 is a pair of flow diagrams showing operations performed between the RMU 500 and a base station (cell) c 80 performed by the RRMA method 100, according to some embodiments. Before describing the flow diagrams in detail, at the end of the operations, the base station c is transmitting $l^c$ and $w^c$ to the RMU 500, as seen at the bottom of FIG. 9.

Looking first at the base station c, the base station c broadcasts the local RRT weight list, $w^c$, collects subscriber station reports, allocates radio resources and accumulates throughput statistics (block 900). These operations are described in more detail in FIGS. 7 and 8.

Over a longer time period, the base station c computes the RRT load factors, checks their evenness (block 902) and updates the RRT weight list $w^c$ (block 904), as described above.

Over a still longer time period, the base station c computes an average load factor, $l^c$, over its local RRTs (block 906). Then, the base station reports the average load factor, $l^c$, together with the local RRT weight list, $w^c$, to the central RMU 500 (block 908).

Simultaneously, the RMU 500 receives the average load factor, $l^c$, and the local RRT weight list, $w^c$, from base station c and stores the information in its RMU memory (block 910).

Also, in some embodiments, the RMU collects load factors, $l^c$, from all BSs, computes $l^c_{mean}$, and updates all $N^c$s. There are different ways to update, but the following conditions should hold, in some embodiments:

$l^c < l^c_{mean} \Rightarrow N^c$ is decreasing
$l^c > l^c_{mean} \Rightarrow N^c$ is increasing
sum of new $N^c$s is equal to N (as well as sum of the old $N^c$s)

In some embodiments, one motivation for the $N^c$-update rule above is that the RMU tries to make the load factors, $l^c$, even over all BSs in the big network. The evenness of $l^c$ implies the evenness of $l(\tau)$ over all $\tau \epsilon T$, which implies optimality of the global RRT weight list, w.

FIG. 10 features two flow diagrams, showing operations between the RMU 500 and base station c 80 performed by the RRMA method 100, according to some embodiments. FIG. 10 describes how the RMU 500 updates BS-weight $N^c$, and sends it to the base station c over the network's backhaul.

Periodically, the RMU 500 updates the BS-weights, $N^c$s. To do this, the RMU checks the evenness of the base station loads (block 1000). If they are not even, then the RMU 500 updates its memory for the $N^c$s (block 1002), as described above. Then, until all base stations are updated (block 1004), the RMU 500 transmits new values of BS-weight, $N^c$ to all base stations 80 (block 1006). Meanwhile, each base station in turn receives and stores its new BS-weight, $N^c$ (block 1008).

In a big network, a p-update cycle is executed by the RMU, in some embodiments. The vector, p, is updated in the same way as in a small network, with the following specifics:

the RMU collects $w^c$ from all BSs; on the basis of this information, the RMU computes averaged reuse pattern weights, W(r)
the RMU transmits the updated p to all BSs FIG. 11 features a pair of flow diagrams showing operations between the RMU 500 and base station c 80, in which the frame partitioning vector, p, is updated by the RRMA method 100, according to some embodiments.

Periodically, the RMU 500 updates the frame partitioning vector, p. To do this, the RMU 500 computes average (over base stations) partition weights, W(r)s (block 1100) and checks their evenness (block 1102). If the partition weights, W(r)s, are not even, then RMU 500 updates the partitioning vector, p (block 1104) and transmits the new partition vector, p, to all base stations (blocks 1106), as described above. At the same time, all base stations 80 receive and store the new partitioning vector, p (block 1108).

Simplified RR Management with Non-Adaptive Fairness Control

With the RRM control parameters, w, p, being converged to their steady state, the histogram, $CDF_{SE/w}$ is still and determines the mapping:

fT: SE/w (u)→fTh(u)

which is defined by the equation (2) and illustrated in FIG. 6.

Generally speaking, fT is not known ahead of w, p adaptation. fT depends on network deployment, the statistics of spectral efficiency, $SE(u,\tau)$, and so on. But, if the fairness requirement is less strict than is defined in equation (1), then some predetermined fT may be used instead of an adaptive one. For example, if fT is defined to be equal to one, this makes an optimal RR allocation, with the throughput of all users being even. Another example is, for a linear fT, then a "proportionally fair" user throughput results. In a third example, fT=sqrt(SE/w(u)). This mapping results in an allocation with a better "edge throughput", but a lesser mean throughput than one with a linear fT.

In some embodiments, the RRMA method 100 uses an algorithm with a predetermined mapping fT being the same as the adaptive one, but the algorithm is simplified as follows:

a BS computes fTh(u) with a simplified formula: fTh(u)=fT(SE/w(u))
BSs do not compute their local histograms, $CDF^c_{SE/w}$
the RMU does not collect the $CDF^c_{SE/w}$, nor compute the "global" histogram $CDF_{SE/w}$, nor transmit it back to the BSs While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A method comprising:
   generating a weight list vector comprising a plurality of weights, each weight being associated with a distinct radio resource type in a cellular network, each radio resource type comprising a pair consisting of a base station and a reuse pattern of a slot, the slot being an equally divided portion of a frame used to transmit data over sub-channels in the cellular network, the reuse pattern being a vector comprising the transmit powers of all base stations in the slot;
   broadcasting the weight list vector to a plurality of users in the cellular network;
   receiving a radio resource type from a user, wherein the radio resource type is selected according to a predefined selection rule;
   allocating a radio resource to a user in the cellular network such that the instant throughput to the user is proportional to its instant fair relative throughput over all users selecting the same radio resource type.

2. The method of claim 1, receiving the radio resource type according to the predefined selection rule further comprising:
   receiving the radio resource type selected by the user as one having a maximum ratio of spectral efficiency to weight, wherein the ratio is a normalized spectral efficiency.

3. The method of claim 1, receiving the radio resource type according to the predefined selection rule further comprising:
   receiving a sub-channel index selected by the user as one having a sub-channel with a maximum normalized spectral efficiency.

4. The method of claim 1, further comprising:
   updating the weight list vector such that the following are true:
   the load factors of radio resource types converge to be even; and the total weight of the radio resources of the entire cellular network is not changed.

5. The method of claim 2, further comprising:
   assigning an instant fair relative throughput to currently active users of the cellular network, wherein the assignment is based on the following:
   a last reported normalized spectral efficiency of a user;
   a cumulative distribution function of normalized spectral efficiency over all users connected to the network; and
   a desired fairness of the throughput distribution to the users.

6. The method of claim 5, further comprising:
allocating to each currently active user a number of radio resource units, the number of radio resource units to provide instant throughput to the allocated user, wherein the allocation is based on the following:
  a last reported spectral efficiency of all active users;
  the proportionality of a user's allocated instant throughput to its assigned instant fair relative throughput, inside a set of all active users which have last reported a given resource type; and
  an allocation of each radio resource unit to some active user, wherein a last reported resource type is equal to the radio resource type of the allocated unit.

7. The method of claim 6, further comprising:
computing an aggregate fair relative throughput and an aggregate throughput of each radio resource type in each weight list update cycle, wherein the aggregate fair relative throughput comprises a sum of instant fair relative throughputs to all users selecting the resource type, during this update cycle, divided by the number of frames forming the cycle, and the aggregate throughput comprises a sum of instant throughputs to all users selecting the resource type, during this update cycle, divided by the number of frames forming the cycle.

8. The method of claim 7, further comprising:
computing a load factor of each radio resource type, wherein the load factor is a ratio of the aggregate fair relative throughput of the radio resource type to the aggregate throughput of the radio resource type.

9. The method of claim 8, further comprising:
computing a base station load factor, wherein the base station load factor is the mean value of load factors of all radio resource types local to this base station; and
transmitting the base station load factor and a local weight list vector to a resource management unit over a backhaul of the cellular network.

10. The method of claim 5, further comprising:
computing a local cumulative distribution function of normalized spectral efficiency;
reporting the cumulative distribution function to a resource management unit; and
receiving a united cumulative function of normalized spectral efficiency from the resource management unit;
wherein the resource management unit unites local cumulative distribution functions and broadcasts the united cumulative distribution function to all base stations in the cellular network.

11. The method of claim 10, further comprising:
receiving a base station weight from the resource management unit, wherein the computation of the base station weight is based on base station load factors received from a plurality of base stations in the cellular network.

12. The method of claim 4, further comprising:
updating a local weight list vector in such a way that the following are true:
  the load factors of local radio resource types converge to be even; but
  the overall weight of the local radio resources divided by the frame size is equal to the last received value of the base station weight, wherein the last received value is received from a resource management unit.

13. The method of claim 9, further comprising:
computing a weight of each frame partition by the resource management unit, wherein the partition weight is equal to a mean value, of weights of radio resource types being a pair of any base station and this frame partition, wherein the computation is based on the reported local weight list vectors from all base stations in the cellular network.

14. The method of claim 13, further comprising:
computing a new partition vector by the resource management unit, the computation being based on computed weights of frame partitions in which the following are true:
  the weights of frame partitions converge to be even; but
  the sum of all partitions is equal to the frame size.

15. The method of claim 11, further comprising:
receiving a new partition vector from the resource management unit over the backhaul of the cellular network.

* * * * *